(12) United States Patent
Vaidyanathan et al.

(10) Patent No.: US 6,697,450 B2
(45) Date of Patent: Feb. 24, 2004

(54) ZIRCONIUM-ALLOY CLAD FUEL RODS CONTAINING METAL OXIDE FOR MITIGATION OF SECONDARY HYDRIDING

(75) Inventors: Swaminathan Vaidyanathan, San Jose, CA (US); John H. Davies, San Jose, CA (US); Steven B. Wisner, Pleasanton, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/330,282

(22) Filed: Dec. 30, 2002

(65) Prior Publication Data

US 2003/0133531 A1 Jul. 17, 2003

Related U.S. Application Data

(63) Continuation of application No. 09/871,972, filed on Jun. 4, 2001, now abandoned.

(51) Int. Cl.[7] .................................................. G21C 3/00
(52) U.S. Cl. ........................ 376/418; 376/412; 376/431
(58) Field of Search .................................. 376/261, 412, 376/417, 418, 431

(56) References Cited

U.S. PATENT DOCUMENTS

| | | | |
|---|---|---|---|
| 3,949,460 A | * 4/1976 | della Porta et al. | 29/428 |
| 4,473,410 A |   9/1984 | Grubb et al. | 148/276 |
| 4,596,690 A | * 6/1986 | Kadambi et al. | 376/418 |
| 4,664,882 A | * 5/1987 | Doshi | 376/423 |
| 5,190,721 A |   3/1993 | Cheng | 376/416 |
| 5,329,566 A |   7/1994 | King | 376/412 |
| 5,434,897 A |   7/1995 | Davies | 376/414 |
| 5,867,552 A | * 2/1999 | Marlowe et al. | 376/457 |
| 5,926,517 A |   7/1999 | Van Swam | 376/416 |
| 6,275,557 B2 | * 8/2001 | Nylund et al. | 376/433 |
| 6,298,108 B1 | * 10/2001 | Farawila | 376/420 |

FOREIGN PATENT DOCUMENTS

| | | | | |
|---|---|---|---|---|
| EP | 0551770 A1 | * 7/1993 | | 376/414 |
| GB | 02-064201 A |   6/1981 | | 376/417 |
| JP | 53-139098 |  12/1978 | | 376/417 |
| JP | 60-038689 |   2/1985 | | 376/418 |
| JP | 04-204196 |   7/1992 | | 376/417 |

OTHER PUBLICATIONS

Davies, J.H.; "Secondary Damage in LWR Fuel Following PCI Defection" Characteristics and Mechanisms; pp. 135–140; (Ref. 1).

Kim, Yeon Soo, et al; "High pressure hydriding of sponge–Zr in steam–hydrogen mixtures"; Journal of Nuclear Materials; 246 (1997) pp. 43–52; (Ref. 2).

Mogard, H., et al; "Irradiation Investigation of the Initial Phase of Degradatin of BWR Type Fuel Rodlets Containing Simulated Single Fretting Clad Defects"; Enlarged Halden Programme Group Meeting on Fuel and Materials Performance; Bolkesjo, Norway, Jun. 9–14, 1991; (Ref. 3).

* cited by examiner

*Primary Examiner*—Michael J. Carone
*Assistant Examiner*—Daniel Matz
(74) *Attorney, Agent, or Firm*—Nixon & Vanderhye

(57) ABSTRACT

Method of fabricating a fuel rod, comprising providing an effective amount of a metal oxide in the fuel rod to generate steam and mitigate the tendency for secondary hydriding. Fuel rods fabricated according to the method of the invention are also provided.

19 Claims, 2 Drawing Sheets

ZIRCONIUM-ALLOY CLAD FUEL RODS CONTAINING METAL OXIDE FOR MITIGATION OF SECONDARY HYDRIDING

This is a continuation of 09/871,972 filed on Jun. 4, 2001 now abandoned.

The present invention relates generally to an improved fuel rod design for use in nuclear reactors. More paticularly, the present invention provides nuclear reactor fuel rods in which one or more metal oxides are present within the fuel rod to mitigate secondary hydriding.

BACKGROUND OF THE INVENTION

When an LWR fuel rod cladding is breached, for example as a result of debris fretting, the coolant water/steam ingresses to the interior of the fuel rod where an oxidation reaction occurs with the fuel and zirconium alloy cladding to produce hydrogen and zirconium and uranium oxide moieties. The net effect of this oxidation reaction is that the oxygen in the steam is progressively removed and the interior space of the fuel rod is filled with a mixture of hydrogen and steam. At a sufficient distance from the primary breach location, the hydrogen is extremely dry, as most of the steam has been reacted out. Under these conditions, the hydrogen is rapidly absorbed by the cladding to form massive secondary hydrides which are brittle in nature. Subsequent loading of the cladding leads to a new rupture at these secondary hydrided locations. The rupture may be cirucumferential or, in some instances, could lead to axial crack propagation. In all cases, there is additional exposure of the fuel and fission products to the coolant. For this reason, it is important to mitigate secondary hydriding of the cladding.

The conditions that relate to the formation of secondary hydrides in zirconium-alloy cladding have been discussed extensively in the literature. It is now well-recognized that massive secondary hydriding takes place when the steam fraction in the steam-hydrogen mixture interior to the cladding falls below a threshold level. Very dry hydrogen conditions are generally needed for massive secondary hydriding of the cladding, and even small quantities of steam will serve to mitigate secondary hydriding.

A need exists for a fuel rod design which will not be susceptible to secondary hydriding of zirconium-alloy fuel cladding in the event of cladding breach and ingress of water or steam to the interior of the fuel rod. The present invention seeks to fill that need.

SUMMARY OF THE INVENTION

It has now been discovered, surprisingly, that secondary hydriding can be mitigated or eliminated by providing one or more metal oxides within the fuel rod. The invention is particularly directed to providing improved fuel rod design for use in a Light Water Reactor (LWR).

In a first aspect, the invention provides a method of fabricating a fuel rod in which the tendency for secondary hydriding is mitigated, comprising the step of providing an effective amount of a metal oxide in the fuel rod. The composition of the metal oxide is generally such that if the hydrogen fraction is above the equilibrium condition for the M/MOx couple, a back reaction occurs between the hydrogen and the metal oxide to generate steam and mitigate secondary hydriding. The metal oxide may be selected from oxides of iron, nickel, tin, bismuth, copper, colbalt, chromium, manganese and/or combinations of such oxides.

In a further aspect, the invention provides a fuel rod with reduced tendency to undergo secondary hydriding, fabricated according to the method of the invention.

BRIEF DESCRIPTION OF THE DRAWINGS

The invention will now be described with reference to the accompanying drawings, in which.

DETAILED DESCRIPTION OF THE INVENTION

Figure 1:
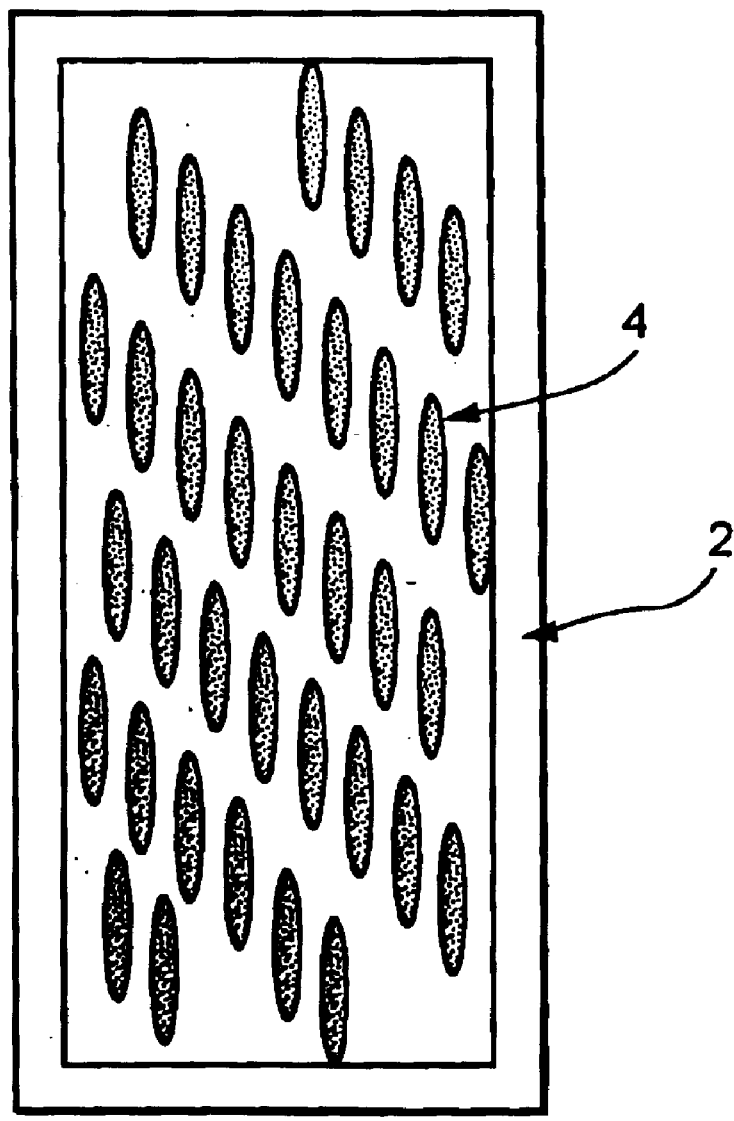
FIG. 1 is a container with perforations or slits in the wall thereof.

The present invention resides in the surprising discovery that secondary hydriding in nuclear reactor fuel rods can be sigificantly mitigated, and in some instances substantially eliminated, by providing in the interior of the fuel rod an effective amount of one or more metal oxides. The oxides may be those of iron, nickel, tin, bismuth, copper, colbalt, chromium, manganese and/or combinations of such oxides. Specific examples of suitable metal oxides are iron oxides ($Fe_3O_4$; $Fe_2O_3$), nickel oxide (NiO), tin oxide ($SnO_2$), copper oxide (CuO) and bismuth oxide ($Bi_2O_3$). The invention finds particular application to uranium oxide fuel contained within zirconium-alloy based cladding. Such fuel rods are commonly employed in LWRs.

When steam enters the interior of the fuel cladding, an oxidation reaction occurs with the fuel/cladding which results in the generation of hydrogen. This may be described generally as follows:

$$xH_2O+Zr=ZrO_x+xH_2$$

$$xH_2O+UO_2=UO_{2+x}+xH_2$$

The hydrogen:steam ratio within the rod in the region near the metal oxide will be dictated by the thermodynamic equilibrium for the Metal/Metal Oxide (M/MOx) couple, evaluated at the temperature within the fuel rod where the metal oxide is located. If the hydrogen fraction rises above the equilibrium condition for the M/MOx couple, back reaction between the hydrogen and MOx will generate steam and maintain the interior at the posited equilibrium.

It is to be noted that in some instances the equilibrium could correspond to a couple such as MOz/MOx where MOz is a lower oxide, that is z<x, and not pure metal. The back reaction is therefore described as follows:

$$MOx+H_2=M \text{ (or } MOz,\ z<x)+H_2O$$

Provided the ratio of steam to hydrogen in equilibrium with the metal oxide is such that the steam fraction is above the threshold level for secondary hydriding, secondary hydriding will be mitigated. Since the steam generated by the back reaction between the hydrogen and metal oxide can easily diffuse over a certain length, secondary hydriding can be mitigated even if the metal oxide is present only at discrete intervals.

The presence of metal oxide may be in accordance with several possible embodiments. In a first embodiment, the metal oxide may be present as a coating on the cladding interior surface. The metal oxide may be selected from iron oxides ($Fe_3O_4$; $Fe_2O_3$), nickel oxide (NiO), tin oxide ($SnO_2$), copper oxide (CuO) and bismuth oxide ($Bi_2O_3$). Bismuth oxide is generally employed as it has a lower cross-section for absorption of neutrons than the other oxides. Generally, the coating is applied to a thickness in the range of 1 mil (25 microns) or less, for example 0.25–0.5 mil.

As a second embodiment, the metal oxide may be present as a coating on the fuel pellet surfaces. The metal oxide may be selected from iron oxides ($Fe_3O_4$; $Fe_2O_3$), nickel oxide (NiO), tin oxide ($SnO_2$), copper oxide (CuO) and bismuth oxide ($Bi_2O_3$). Bismuth oxide is generally employed as it has a lower cross-section for absorption of neutrons than the other oxides. Generally, the coating is applied to a thickness in the range of 1 mil (25 microns) or less, for example 0.25–0.5 mil.

As a third embodiment, the metal oxide may be present as individual pellets or as wafers between fuel pellets, or at the bottom of the fuel stack or at the top of the fuel stack or combinations thereof. Generally, the individual pellets or wafers will be of nearly the same geometry (diameter) as the pellet, possibly a little larger. In the instance where they are present between the fuel pellets, the pellet or wafer thickness will depend upon the number of pellets or wafers used. The pellets or wafers are generally fabricated by sintering the metal oxide powder selected from iron oxides ($Fe_3O_4$; $Fe_2O_3$), nickel oxide (NiO), tin oxide ($SnO_2$), copper oxide (CuO) and bismuth oxide ($Bi_2O_3$).

As a fourth embodiment, reference is made to the accompanying FIG. 1 showing a container 2 with perforations or slits 4 in the wall thereof which provide free access to the surrounding gases. The container is typically fabricated of a material that does not react with the metal oxide, such as stainless steel. The container wall has a thickness of 10 mils or less and an outside diameter which is essentially the same as fuel pellets, or slightly larger. The metal oxide may be present in the container 2 as a powder or pellet, as described above.

In a fifth embodiment, the metal oxide may be discretely distributed (rather than in a continuous manner) along the fuel rod. The metal oxide may be in any of the configurations described in the first through fourth embodiments above.

Figure 2:
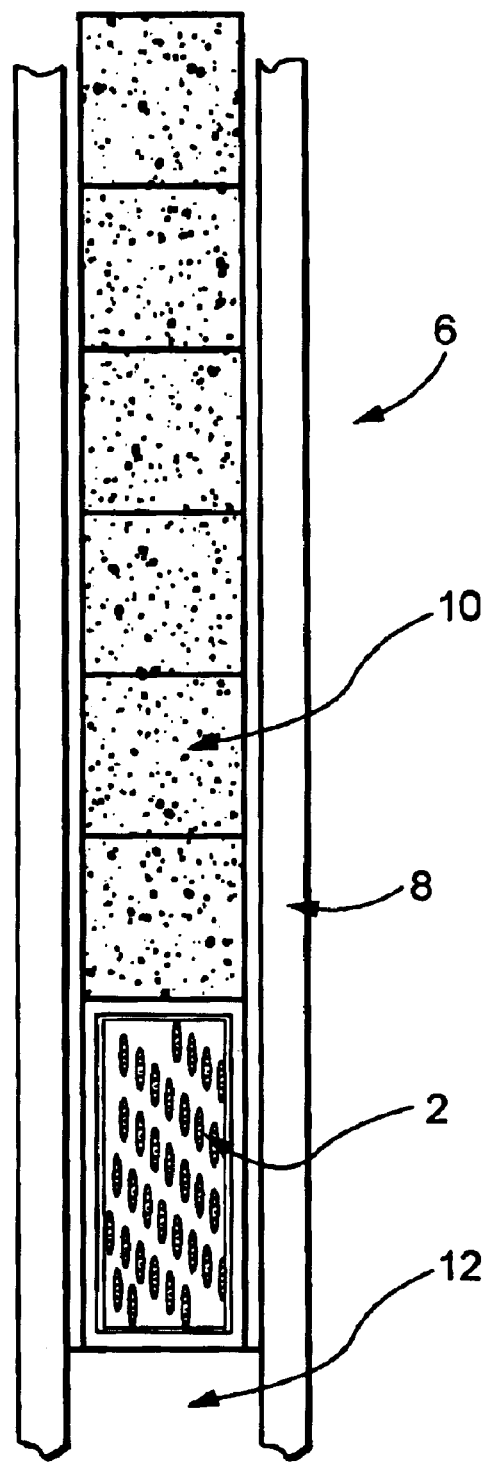
FIG. 2 is a fuel rod with the metal oxide within the rod.

In a sixth embodiment, referring to FIG. 2, there is shown a fuel rod 6 comprising an outer cladding 8 and a fuel pellet stack 10. A container 2 as described above, is provided at the bottom of and retained in place by bottom end cap 12 and the fuel stack 10 containing metal oxide. FIG. 2 illustrates the situation where the container is at the bottom of the fuel stack. However, a similar container may also be placed at the top of the fuel stack. In the usual arrangement, a container is placed at the bottom of the fuel stack, and a further container may optionally be present at the top of the stack. When a container is at the top of the fuel stack, there is a plenum and a retainer spring (not shown) which presses down on the container to hold it in place.

The specific metal oxide to be used for secondary hydriding mitigation may be selected from the oxides of Ni, Fe, Sn, Bi, Cu, Co, Cr, and Mn. The metal oxide is typically present in each fuel rod in an amount of up to about 15 grams, more usually up to about 12 grams, for example 2 to 10 grams.

The specific metal oxide to be chosen is to be based on whether the metal oxide reacts with hydrogen rapidly enough. The rapidity of this reaction must be such that the rate is sufficiently fast so that it can counteract the rate at which hydrogen is produced in the forward reaction.

A further factor in the choice of metal oxide is whether the equilibrium hydrogen:steam ratio is sufficiently rich in steam to avert secondary hydriding. Generally, if the pressure of steam is greater than about 5% of the hydrogen pressure, it is believed that hydriding can be avoided.

Generally, the oxides of iron, nickel, tin, bismuth and copper are employed. Bismuth oxide ($Bi_2O_3$) is typically employed when the metal oxide is to be placed in the fuel pellet column space as it minimizes parasitic neutron absorption from the introduction of metal oxide into the core. Copper oxide (CuO) is typically employed when the metal oxide is to be located at the bottom or at the top of the fuel column where parasitic neutron absorption is not a prime consideration. Oxides of specific isotopes of these materials that minimize parasitic absorption may also be employed.

EXAMPLE

The following example serves to illustrate the present invention.

Tests have been conducted where a zirconium strip was placed in a confined space within a stainless stell container and hydrogen admitted to the confined space through a very small hole in the container. The strip was shown to be massively hydrided within one day at 400° C. However, when specific metal oxides were present within the confined space, in addition to the zirconium strip, no hydriding was evident when tested under the same configuration and test conditions. The tests were conducted with $Fe_2O_3$, $Fe_3O_4$, CuO, $Bi_2O_3$, NiO and $SnO_2$.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of fabricating a fuel rod, comprising the step of providing an effective amount of a metal oxide in the fuel rod to cause generation of steam and mitigate secondary hydriding.

2. A method according to claim 1, wherein the composition of the metal oxide is such that if hydrogen fraction is above the equilibrium condition for the a metal/metal oxide couple, a back reaction occurs between the hydrogen and the metal oxide to generate steam.

3. A method according to claim 1, wherein the metal oxide is selected from oxides of iron, nickel, tin, bismuth, copper, colbalt, chromium, manganese and combinations of such oxides.

4. A method according to claim 3, wherein the metal oxide is bismuth oxide.

5. A method according to claim 1, wherein the metal oxide is present in an amount ranging from 2 up to 10 grams per fuel rod.

6. A method according to claim 1, wherein the metal oxide is present as a coating on an interior surface of cladding of the fuel rod.

7. A method according to claim 1, wherein the metal oxide is present as a coating on fuel pellet surfaces.

8. A method according to claim 1, wherein the metal oxide is present as individual pellets of a fuel pellet stack, or as wafers.

9. A method according to claim 8, wherein the individual pellets or wafers are between fuel pellets.

10. A method according to claim 8, wherein the individual pellets or wafers are at the top of the fuel pellet stack.

11. A method according to claim 8, wherein the individual pellets or wafers are at the bottom of the fuel pellet stack.

12. A method according to claim 8, wherein the individual pellets or wafers are at the top and bottom of the fuel pellet stack.

13. A method according to claim 1, wherein the metal oxide is within a container.

14. A method according to claim 13, wherein the metal oxide is present as a powder or pellet within said container.

15. A method according to claim 13, wherein said container is at the bottom of a fuel pellet stack.

16. A method according to claim 13, wherein said container is at the top of a fuel pellet stack.

17. A method according to claim 13, wherein said container is at the top and bottom of a fuel pellet stack.

18. A method according to claim 1, wherein the metal oxide is distributed intermittently along the fuel rod.

19. A fuel rod fabricated according to the method of claim 1.

* * * * *